(12) United States Patent
Chirnomas

(10) Patent No.: US 7,850,042 B2
(45) Date of Patent: *Dec. 14, 2010

(54) AIR BARRIER

(76) Inventor: Munroe Chirnomas, 47 Skyline Dr., Morris Township, NJ (US) 07960

( * ) Notice: Subject to any disclaimer, the term of this patent is extended or adjusted under 35 U.S.C. 154(b) by 0 days.

This patent is subject to a terminal disclaimer.

(21) Appl. No.: 11/621,554

(22) Filed: Jan. 9, 2007

(65) Prior Publication Data

US 2007/0108220 A1    May 17, 2007

Related U.S. Application Data

(63) Continuation of application No. 10/505,830, filed as application No. PCT/US03/06051 on Feb. 26, 2003, now Pat. No. 7,159,410.

(60) Provisional application No. 60/360,128, filed on Feb. 26, 2002.

(51) Int. Cl.
   *B65H 3/08*    (2006.01)

(52) U.S. Cl. .................... 221/210; 221/92; 221/211; 221/150 R

(58) Field of Classification Search .......... 221/1–312 C
   See application file for complete search history.

(56) References Cited

U.S. PATENT DOCUMENTS

| 5,240,139 | A | * | 8/1993 | Chirnomas | ...................... 221/2 |
| 5,555,793 | A | * | 9/1996 | Tocchet et al. | ................. 99/326 |
| 5,971,205 | A | * | 10/1999 | Michaels et al. | ............. 221/135 |
| 7,159,410 | B2 | * | 1/2007 | Chirnomas | ................... 62/250 |

* cited by examiner

*Primary Examiner*—Gene Crawford
*Assistant Examiner*—Michael K Collins
(74) *Attorney, Agent, or Firm*—Lawrence C. Edelman

(57) ABSTRACT

A vending machine apparatus comprising a housing defining an internal cavity and an article storage compartment positioned inside the cavity. An air barrier arrangement having a plurality of moveable barriers separates the article storage compartment from an article extracting device.

28 Claims, 6 Drawing Sheets

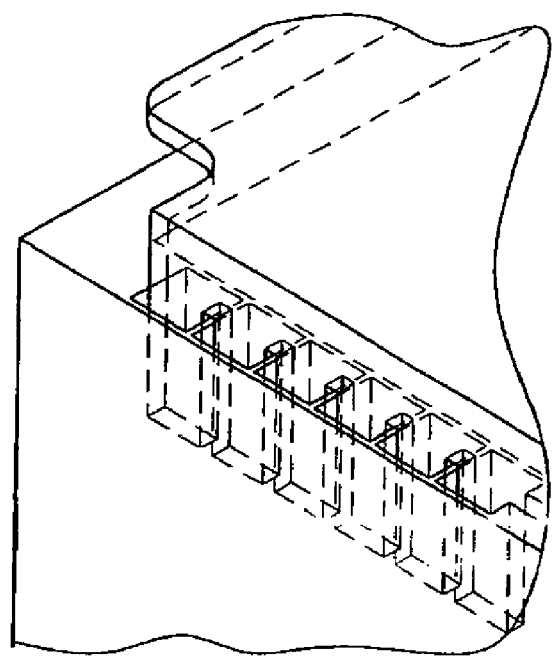
VIEW A
FIG. 5C
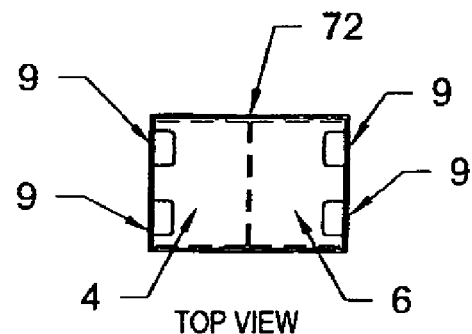
TOP VIEW
FIG. 6B
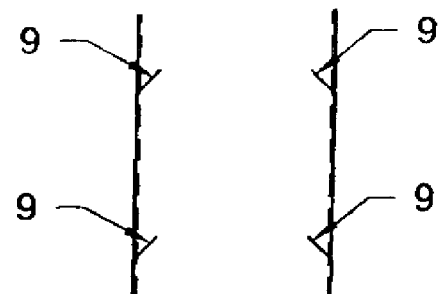
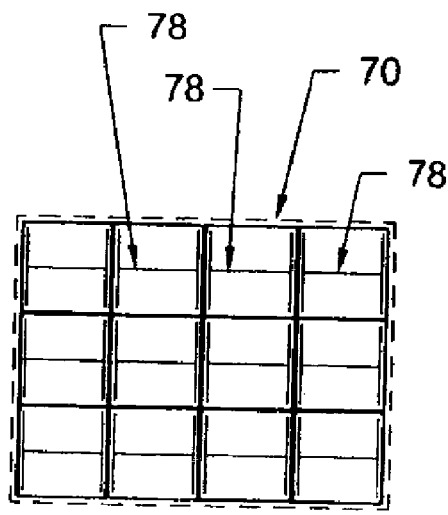
FIG. 7
SIDE VIEW
FIG. 6A

AIR BARRIER

CROSS-REFERENCE TO RELATED APPLICATIONS

This application is a continuation of U.S. patent application Ser. No. 10/505,830 filed Aug. 26, 2004 now U.S. Pat. No. 7,159,410, which is a US national phase of PCT/US03/06051 filed Feb. 26, 2003, which application claims priority of U.S. Provisional Patent Application No. 60/360,128 filed Feb. 26, 2002, each of these applications being entitled "Thermal Barrier For A Refrigerated Compartment In A Vending Machine". The entire disclosure of each this prior patent application is incorporated herein by reference in their entirety.

SUMMARY OF THE INVENTION

The present invention is directed to a method and apparatus for providing an air barrier for an article storage area.

BRIEF DESCRIPTION OF THE DRAWINGS

The accompanying drawings, which are incorporated herein and constitute part of this specification, illustrate exemplary embodiments and details of the invention, and, together with the general description given above and the detailed description given below, serve to explain the features of the invention.

FIGS. 5A, 5B and 5C illustrate an alternative embodiment useful for attaching the thermal separating flaps of the present invention to the top of an article storage compartment.

FIGS. 6A and 6B illustrate a further alternative embodiment of the invention.

FIG. 7 illustrates an even further alternative embodiment of the invention.

DETAILED DESCRIPTION OF THE PREFERRED EMBODIMENT

Figure 1:
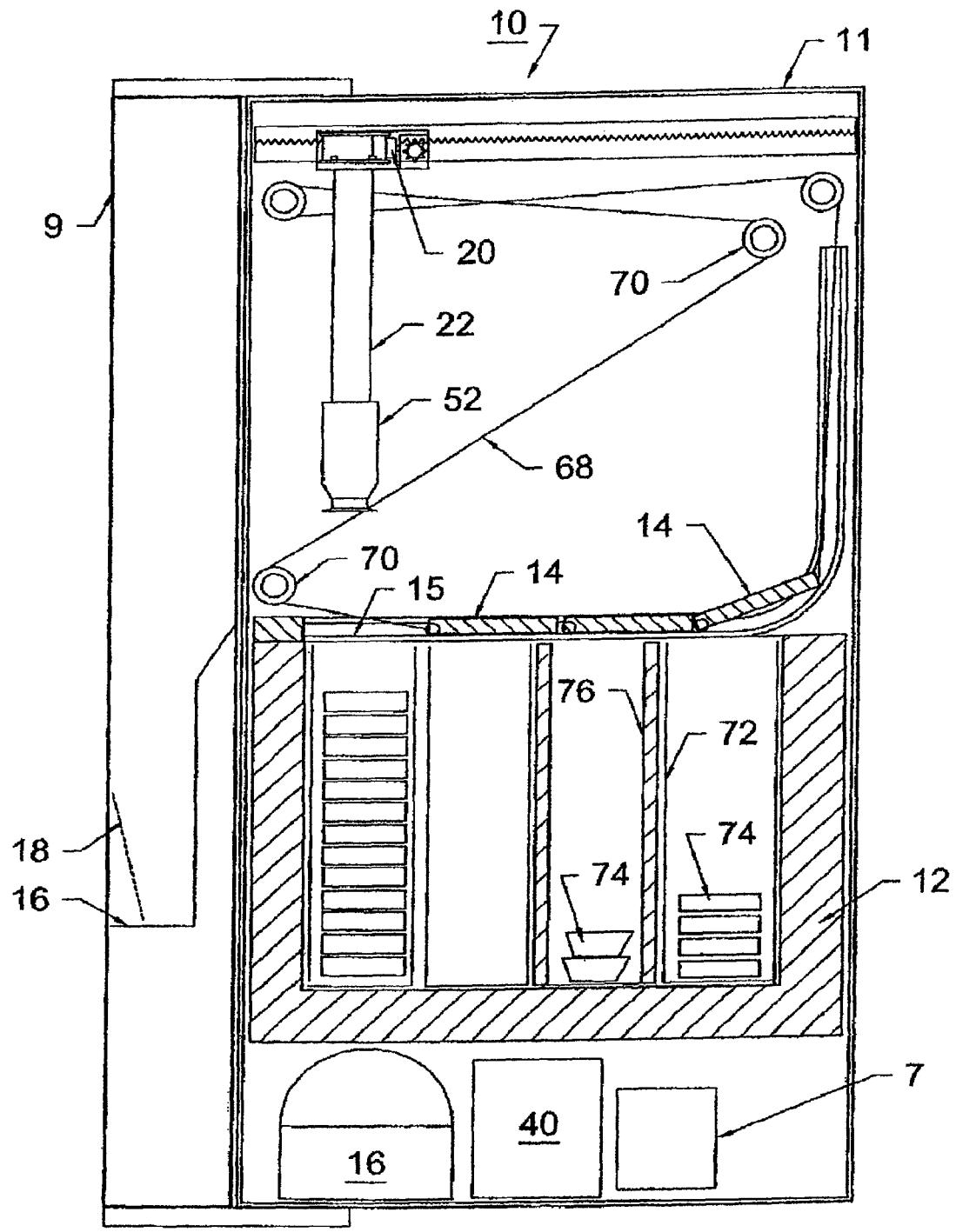
FIG. 1 is a side section view which illustrates a prior art vending machine useful for illustrating an environment for the present invention. The vending machine includes a refrigerated article storage compartment, and has a displaceable thermal separating door for separating the open end of a refrigerated compartment from the remainder of the interior of the vending machine.

FIG. 1 illustrates a prior art vending machine 10, such as known by prior U.S. Pat. No. 5,240,139 (incorporated herein by reference), useful for illustrating one environment useful for the present invention. Machine 10 has an outer housing 11 and hinged front door 9 for forming a cabinet for the vending machine. Housing 11 includes therein a refrigerated insulated compartment 12 for storing articles to be vended. In one embodiment, refrigerated compartment 12 has associated therewith a refrigeration unit 16 and a displaceable thermal separating door 14 positioned over an opening 15 in one side, in this case the topside, of compartment 12. Door 14 provides a thermal separation at the opening 15 between the remainder of the interior of the vending machine and the interior of compartment 12. The above-noted U.S. Pat. No. 5,240,139 shows and describes several different embodiments for door 14, including a single-piece hinged door which makes a vertical arcuate motion during opening/closing, as well as several "sliding" door designs. It is also noted that an "air curtain" can also form a thermal barrier that functions as a door, as well as merely having an air gap over compartment 12, which in some situations may be sufficient for effective operation of the vending machine, since cold air sinks, and therefore tends to stay within compartment 12 when left undisturbed. Compartment 12 includes therein open-topped subdivided sections 72 adapted for storing articles 74, such as ice cream or other frozen or refrigerated foods in a cooled environment until they are selected to be dispensed by a user of vending machine 10. A plurality of divider walls 76 are positioned inside compartment 12 so as to form the subdivided sections 72.

It is noted that compartment 12 may be of the "static" type, which has the evaporator coils distributed along and in thermal contact with the inside walls which form the main interior volume of compartment 12, and the condenser coils thermally insulated from the evaporator coils and distributed along and in thermal contact with the walls which form the outside perimeter of storage compartment 12. With this type of freezer, no fans are required for the refrigeration system since the cooling effect of the evaporator coils is directly radiated to the interior of compartment 12, and the heat generated by the refrigeration system is directly radiated by the outside walls of compartment 12 to the external environment. Such chest freezers are commonly available from many sources. Other techniques for developing a cooled environment in compartment 12 could just as easily be used with the present invention, such as what is conventionally known as a forced air system, having a separate refrigeration unit for developing cooled air, which cooled air is then directed to the interior of compartment 12.

In operation, after a user of the vending machine has inserted the proper payment and made a valid selection of an item stored in the vending machine, a control mechanism 40 of machine 10, of conventional design, causes an article pickup carriage 20 having a suction hose 22 and pickup head 52 hanging therefrom, to be laterally positioned over the section 72 which stores at least one of the selected articles. In the illustrated embodiment, movement of carriage 20 causes door 14 to become displaced, via cable 68 and rollers 70, so as to egress of article pickup head 52. The control mechanism 40 then causes a motor in carriage 20 to operate so that the article pickup head 52 controllably enters the selected compartment 72, suction generated by a blower motor 7 is conducted thereto via hose 22 (the full length of hose for connection to blower motor 7 is not shown in this Figure, but as one of ordinary skill in this art would realize, is required), and an article 74 thereby becomes secured to the article pickup head 52. The motor in carriage 20 is operated again, this time in a reverse direction, so as to extract article pickup head 52, and the selected article, from compartment 72, and then deposit the selected article 74 in a customer retrieval area 16 by removing the suction force from pickup head 52 when the pickup head 52 is in positioned over the open top of customer retrieval area 16. A customer access door 18 allows the user access to retrieve the dispensed article.

In view of the public availability of my above-noted patent, and the widely known construction and operation of vending machines of this type, no further description of how to make and use a vending machine of the type described so far, is considered necessary.

With such a device, during normal machine operation, the thermal barriers between the cooled areas and ambient areas located inside of housing 11, in this case doors 14 and 18, are opened and closed many times, thereby repeatedly exposing warm air from housing 11 to the cooled air in compartment 12. Since cold air is heavier than warm air, when the door 14 is opened, the colder air tends to stay in the storage compartments 72, however, typically there is some unwanted mixing of the ambient air with the refrigerated air at the top of the storage compartments 72, at least partially due to air currents caused movements of the picker head, the opening and closing of door 14 and other parts of machine 10, thereby introducing unwanted heat into the freezer. At least some of this unwanted hot air was generated by the compressor and condenser as described above.

It is one object of the present invention reduce this unwanted mixing of hot air in compartment 12.

Figure 2:
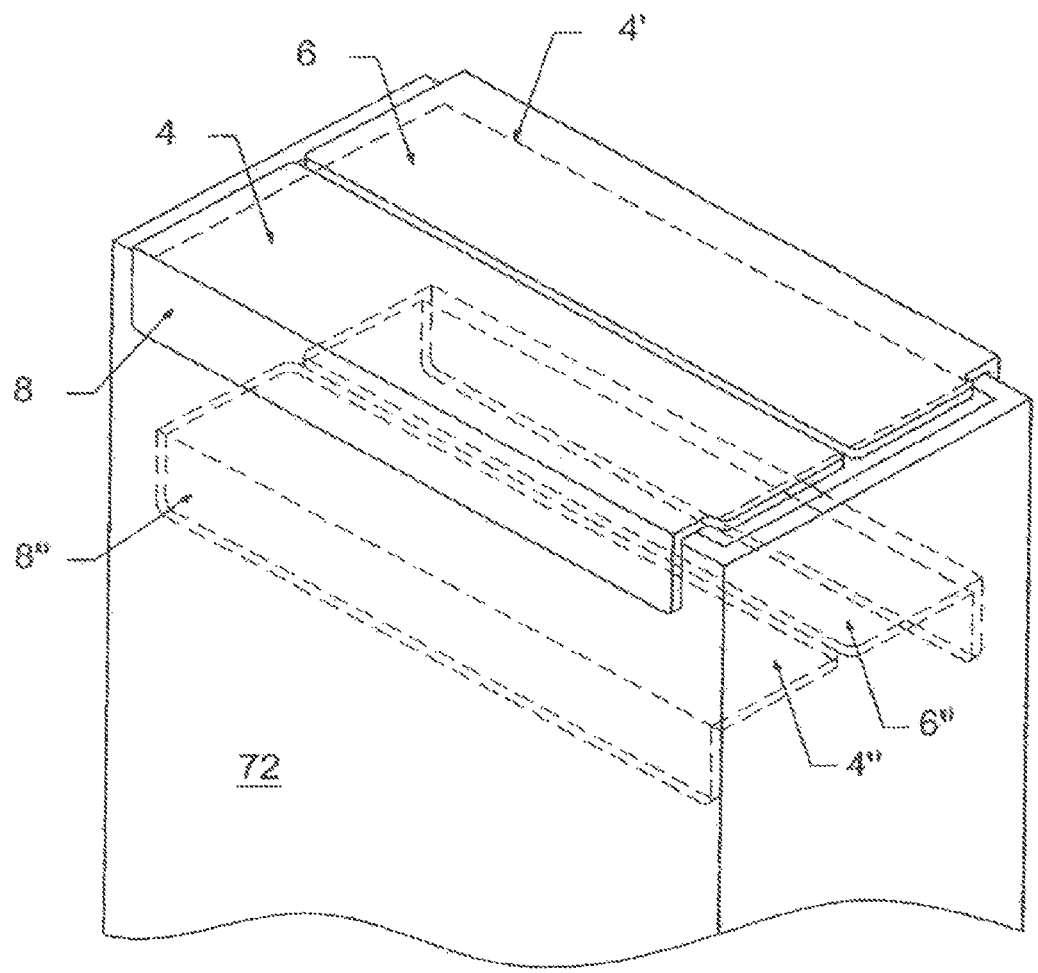
FIG. 2 illustrates a perspective view a thermal barrier arrangement near the top of an article storage compartment of the type shown in FIG. 1, the barrier arrangement being constructed in accordance with the principles of the invention.

FIG. 2 illustrates one embodiment of the present invention, where a displaceable thermal barrier is provided at the dispensing end, i.e., open top, of one or more of the refrigerated article storage compartments 72. It is noted that these individualized displaceable thermal barriers could be useful in addition to the thermal barrier function provided by a displaceable thermal barrier which is common to the compartments 72, such as the door 14.

As shown in FIG. 2, the displaceable barrier comprises a pair of opposed flaps 4 and 6. Each flap has one long edge which is attached to an opposite long side of a storage compartment 72 via folded tab portions 8, and a free end which abuts the free end of an opposed flap in an aligned manner, as shown. The cross-sectional area of the folded flaps 4 and 6 are adjusted to be slightly less than the cross-sectional area of the opening at the top of storage compartment 72, so that flaps 4 and 6 are able to be freely displaced in a direction into and out of compartment 72. The folded tab portions 8 can be attached to the outside walls of the top opposed ends of compartment 72 using conventional adhesive techniques, or other techniques well known to those of ordinary skill in this technology, such as sonic welding in the event that the components are thermo-plastic, etc. It is also noted that these tabs can be formed integrally with the walls of the compartments 72.

In a modification of this embodiment of the invention, a single flap 4', enlarged as compared to the flap 4 shown in FIG. 2 so as to have approximately the same cross-sectional area as the combined flaps 4 and 6, and thereby substantially provide by itself a thermal barrier over the open end of a storage compartment 72, could be used in place of the pair of flaps 4 and 6. In this embodiment, the material used to form flap 4' may be different from that used for flaps 4 or 6, since flap 4' may need to have need to have a bit more rigidity so as to effectively span the end opening of compartment 72.

In operation, when a thermal separating door, such as door 14 shown in FIG. 1 is displaced, thereby exposing the open ends of the article storage compartments to the ambient environment, the opposed flaps 4 and 6 effectively "seal off" the open ends of the storage compartments from the ambient environment, thereby substantially preventing air currents, which are typically warmer than the air inside the compartments 72, from exposing the products near the top of the article storage compartment to the ambient environment. Furthermore, an article pickup head, such as pickup head 52 shown in FIG. 1 can still have access to the interior of storage compartment 72 since the flaps 4 and 6 can be easily deflected into the storage compartment as the pickup head is lowered, and can be easily deflected outwardly from the compartment 72 as the pickup head with the selected article secured thereto is raised from inside the compartment.

It is noted that flaps 4 and 6 could be constructed of a thin and flexible material in order that the above-noted functions can be easily provided. Such materials may comprise a plastic, silicon or even an insulating foam sheet material having a thickness, in a typical application, of approximately 0.5 to 0.001 inches, depending upon the flexibility of the material used to make the flaps. In accordance with one aspect of the invention, the flaps can be manufactured of a material that is so flexible that they offer substantially no resistance to the passage of the article pickup head 52 therethrough, (especially if serrations are provided therein, as to be described more fully in conjunction with FIGS. 3 and 4) on its way into a compartment 72 to get a selected article 74, nor have any tendency to dislodge a selected article 74 as the article pickup head 52 is removed from the compartment 72. Yet, the flaps are substantial enough so that when they are not physically disturbed, they remain in place over the open end of the cooled article storage compartments 72 and substantially prevent the mixing/introduction of ambient air into the compartments. It is noted that ideally, the center of the flap openings are located over the center of the articles that are stored in compartments 72.

Thus, one aspect of the invention is to provide at least one displaceable thermal separator which is individual to an open end of a plurality of the refrigerated storage compartments in an article storage area, which individual displaceable thermal separator may be in addition to a thermal separator function which is in common with the plurality of refrigerated storage compartments, such as provided by door 14. This will allow access to selected articles in given sub-portions of the article storage compartments when the common thermal separator, if one is used, is displaced, without exposing the remainder of the refrigerated storage compartments in the article storage area to the ambient environment. Additionally, such an arrangement minimizes egress of warm air into the selected sub portion of the article storage area before and after the article pickup head 52 passes therethrough.

It is noted that the thermal separator which is common to the plurality of article storage compartments, can be provided by the displaceable door shown by 14 in FIG. 1, but in alternative embodiments, the common thermal separator can be provided by other types/shapes of doors, such as those shown in my forenoted U.S. Pat. No. 5,240,139, such as a horizontal lid hinged at the rear of compartment 12. In an even further alternative embodiment, the common thermal separator can comprise a laminar flow of air, commonly called an air curtain. Using an air curtain as the common thermal separator, allows quick and easy displacement of the common thermal separator by the pickup head 52, i.e., by merely piercing, and thus displacing, the laminar flow. Cooled air is preferably used to form the curtain in order to minimize warming of the contents of compartment 12 by displaced air from the laminar flow.

It is noted that the bins 72 could be individually removable from compartment 12, and in fact compartment 12 could be wholly or partially removable from inside of housing 11 in order to facilitate reloading of the compartments 72 will articles to be vended.

Many variations of this invention are possible, both in the manner of forming/attaching the individual displaceable thermal separators over the openings of the article storage compartments 72, as well as the dimensioning, structure, shape and choice of materials for the thermal separators.

Figure 3:
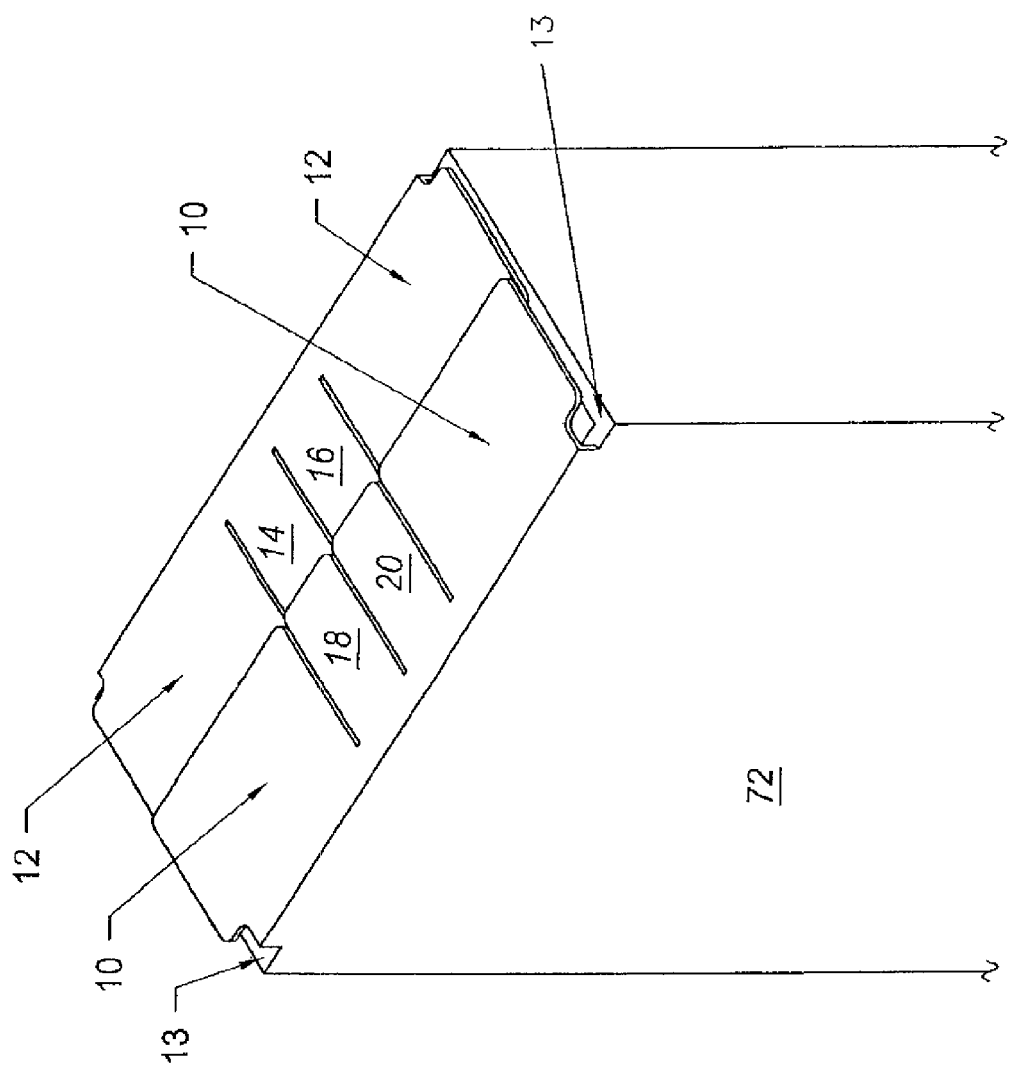
FIG. 3 illustrates a perspective view of an alternative embodiment of a thermal barrier arrangement near the top of a storage compartment, constructed in accordance with the principles of the present invention.

For example, FIG. 3 illustrates an embodiment where the flaps are formed integrally with the sidewalls. For example, the side walls may be comprised of a corrugated sheet of plastic or paperboard, and the flap sections can be comprised of a compressed portion of the same material. Additionally, in this illustrated example the flap portions 10 and 12 are dimensioned so as to overlap each other, and to overlap the outer cross-sectional area of the opening at the top of storage compartment 72.

Alternatively, the opposed ends of flaps 10 and 12 shown in FIG. 3 may not overlap each other, and instead abut each other, as shown in FIG. 2, if the hinge portion of the flaps (like portions 8 of FIG. 2), are substantial enough to nominally hold the flaps in the horizontal position.

Irrespective of weather flaps 10 and 12 overlap each other or not, flaps 10 and 12 will rest upon the top-facing outer edges 13 that define the open top end of compartment 72 and therefore not be displaceable towards the interior of the storage compartment, yet be freely displaceable in a direction extending outwardly from the storage compartment. This type of construction allows flaps 10 and 12 to be made of a more substantial material, which may provide a benefit in certain environments and/or applications. In order to allow pickup head 52 free access into and out of the storage compartments 72 to retrieve articles from therein, flaps 10 and 12 can include serrations so as to form sub-flaps 14, 16, 18 and 20 which are susceptible to bi-directional displacement due to hinging action provided by the material which forms the rear of each flap.

Figure 4:
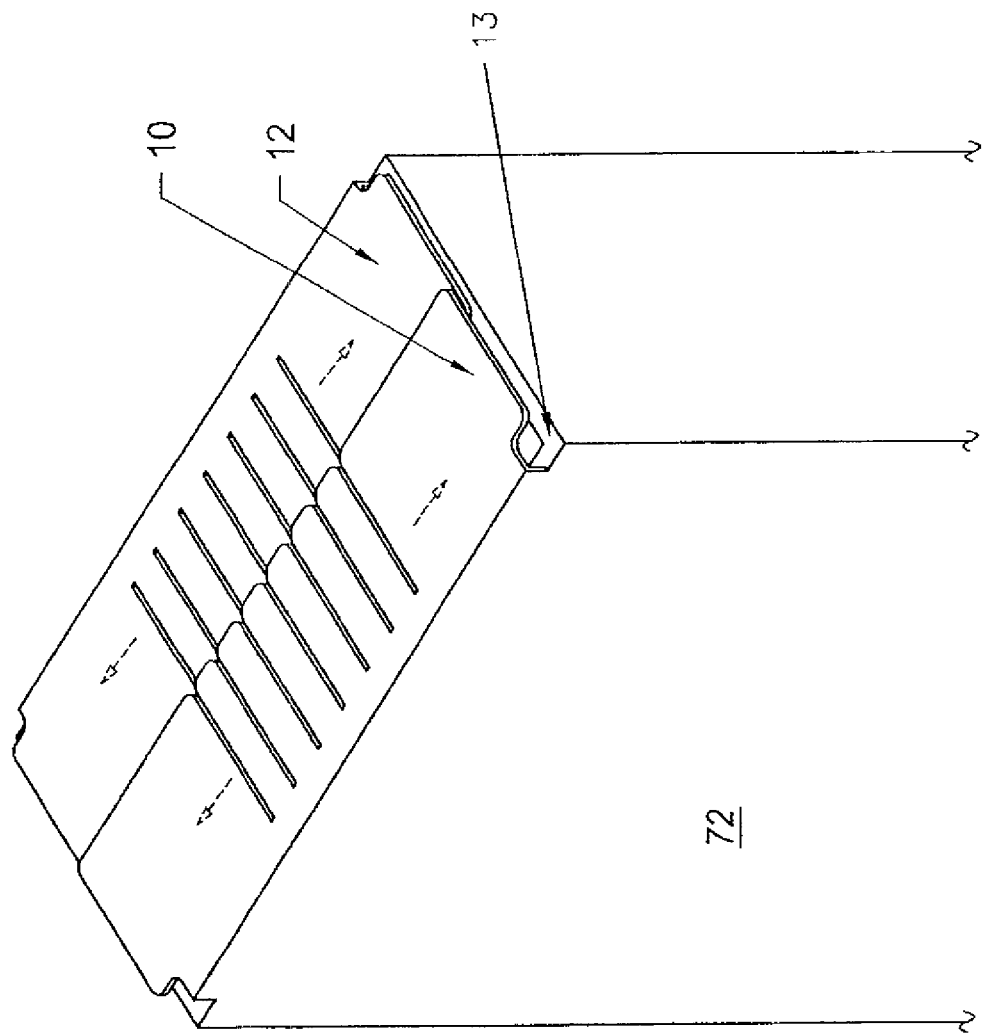
FIG. 4 illustrates an alternative embodiment of the FIG. 3 arrangement.

In an alternative embodiment, such as shown in FIG. 4, additional serrations could be included and the shape of the serrations narrowed, so that the bidirectional flaps formed by the serrations extend across substantially the entire portion of flaps 10 and 12, as shown by the dashed lines. This embodiment allows a greater tolerance for the positioning of pickup head 52 over the opening in each compartment 72, as well as an improved flexibility for the bi-directional displacement of the serrated flaps.

In operation, certain ones of the bi-directional flaps shown in FIG. 3 or FIG. 4 would deflect upon impact of an article pickup head 52 which is opposed thereto, so as to allow the article pickup head 52 to enter the storage compartment, while the remainder of the flaps are not deflected. Once inside the compartment 72, article pickup head 52 will become secured to a selected one of articles 74 due to the suction force provided thereto, and article pickup head 52 will then move in a direction so as to extract the article 74 from the storage compartment 72. As the article pickup head 52 is extracted, the flaps 10 and 12 will freely deflect/become displaced in a direction outwardly from the storage compartment, and thereby provide no impediment to an easy extraction of the pickup head 52 with article 74 attached thereto. After the pickup head 52 and secured article have been fully extracted, the flaps 10 and 12 are pre-biased so as to return to their normally closed position over the open top of the storage compartment 72, thereby quickly and effectively preventing unwanted air currents from entering that storage compartment 72. Additionally, the flaps 10 and 12 positioned over the open tops of the other ones of compartments 72 in storage area 12 are not displaced, and these flaps also are useful for preventing the introduction of ambient air into these other compartments 72. Thereafter, a common door 14, if one is used, would be positioned over the top of compartment 12, for providing even further thermal isolation for the refrigerated articles stored therein.

In a further alternative embodiment of the invention, the thermal separating flaps of the invention can be provided redundantly, so as to possibly further improve the thermal separation of the stored articles from the ambient environment. Use of redundant flaps is illustrated in FIG. 2, via dashed lines, which show a second set of flaps 4" and 6" which are similar in structure and function to flaps 4 and 6, and which also have tab portions 8" useful for attaching the set of redundant flaps 4" and 6" to the inside walls of compartment 72. The gap between the upper and lower set of flaps defines an air space which improves the thermal separation function provided to the articles stored inside the compartment, as compared to the thermal separation function provided by only one set of flaps. The vertical spacing between each set of flaps could be such that the inward deflection of the upper set will not contact the upper side of the lower set (i.e., each set will operate independently and the upper set can substantially closed before the lower set is opened. Alternatively, the sets can be positioned relatively close to one another so that they operate in unison, yet still advantageously define a thermally separating air gap therebetween. It is noted that in an even further alternative embodiment, a single large redundant flap, such as one large flap redundant to flap 4 of FIG. 2, can be used. In this regard, the function of redundant flaps which define an air gap therebetween can also be provided by using a single set of flaps 4 and 6 wherein each of the flaps is comprised of a multi-layered material so as to form an air gap therebetween, such as a "bubble-wrap" type of material.

Figure 5A:
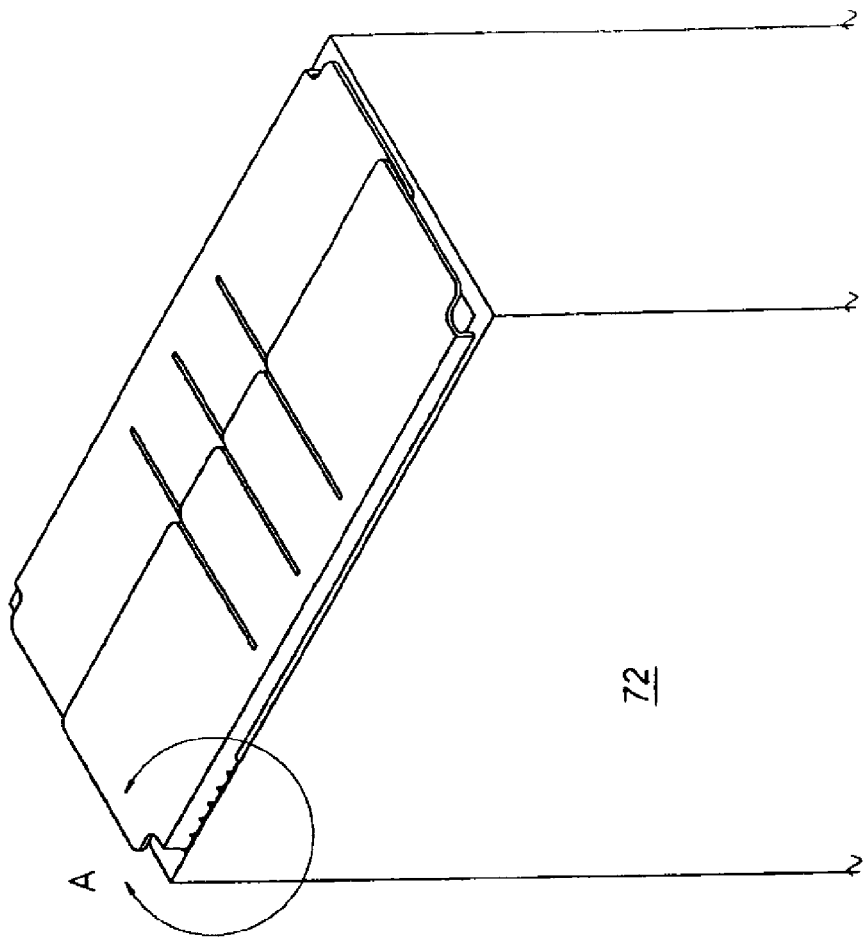
Figure 5B:
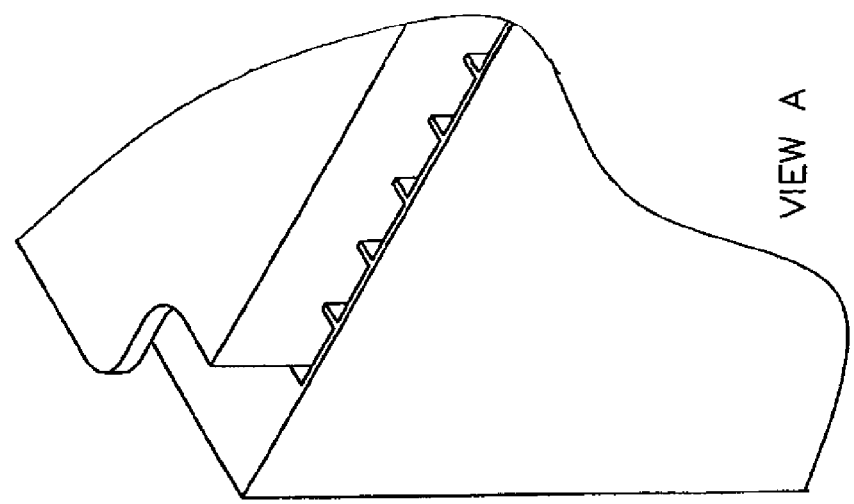

FIGS. 5A, 5B, and 5C illustrate one of many alternative techniques for positioning thermal separating flaps over the open end of the storage compartments, and basically comprises providing at the hinge/attaching edge of the flaps a series of teeth dimensioned for insertion into the interstitial spaces formed by the longitudinal corrugations in the side wall material which comprises the storage compartment 72. This alternative embodiment for attaching the flaps is shown in detail in FIGS. 5B and 5C.

While the present invention has been disclosed with reference to certain embodiments, numerous modifications, alterations and changes to the described embodiments are possible without departing from the sphere and scope of the present invention, as defined above, and claims which follow at the end of this description.

For example, it is noted that the invention described herein is not limited to any specific type of article retrieving device (such as the illustrated pickup head 52). For example, it may be desirable for the robotic positioning mechanism to include a rotary device (R, θ) of the type including an I beam of fixed length (or telescopic sections), for establishing an "R" movement for pickup head 52, and where pivoting of the I beam establishes a "θ" movement. Alternatively, in other environments for the invention, the pickup head positioning mechanism may include an articulated arm or scissor system, or use a totally different dispensing technique, such a the more conventional spiral wire dispenser mechanism. Other types of suitable pickup devices include a mechanical claw or scoop, a magnetic attracting device, a portable suction generator, etc.

Furthermore, other types of storage compartments are usable in the environment of the present invention, such as article storage compartments including horizontally oriented stacks of stored articles, wherein the storage area has one or more vertically oriented openings at the dispensing end thereof. All that is required of the storage/dispensing arrangement is that the selected article requires passage through the dispensing end of the article storage compartment.

Even furthermore, it is noted that compartment 12 can be mechanically mounted and electrically connected within housing 11 so as to be at least partially removable therefrom, such as by the use of sliding tracks mounted between a bottom portion of compartment 12 and a floor portion of housing 11, so as to assist repositioning of compartment 12 to be at least partially outside of housing 11, thereby facilitating access to the interior of compartment 12 during re-loading of compartment 12 with fresh articles to be vended. If necessary, any electrical connection to compartment 12 required for operating the cooling equipment associated therewith, could be selectively disconnectable, so as to facilitate the repositioning of compartment 12.

In a still further alternative embodiment of the invention shown by the top and side views of FIGS. 6A and 6B, the individual article storage compartments 72 can be constructed as shown by PCT patent application publication WO 02/01525 (which designates the US, and has its entire text incorporated herein by reference), so as to include article supporting tabs 9. The sidewalls of compartment 72 has pairs of opposed slot openings therein, and the flexible tabs 9 are attached to the outer wall of compartment 72 so that a portion of each tab 9 intrudes into the interior space of the compartment by passing through the slot. Tabs 9 are biased upward so as to form flexible load-bearing supports for articles stored in the compartment so that the full weight of those articles in the upper portion of the compartment does not rest on the lower articles, yet, when the pickup head 52 is removing a selected article towards the end opening in the compartment, the tabs simply and easily fold up and away from the articles, and thereby provide negligible resistance to article extraction.

With this arrangement, the thermal separating flaps of the present invention can be attached, for example by using an adhesive, to a set of tabs 9, or to compartment walls positioned near the top of the compartment, such as shown by flaps 4 and 6 in the top view of FIG. 6a.

FIG. 7 shows a top cross-sectional view of the storage area of a vending machine constructed in accordance with the principles of the invention, for illustrating an even further alternative embodiment of the invention, wherein a single sheet member 70 as shown by dashed lines, covers the open dispensing-ends of a plurality of the storage compartments 72. The outer edges of sheet 70 can be attached to the outside perimeter walls of the group of compartments 72, or to the top opening rim of freezer compartment 12, while the interior of sheet 70 can have a plurality of "H" shaped cuts or slits 78 formed therein which are aligned with the open dispensing-end of each compartment 72. Each of the "H" shaped cuts or slits 78 effectively forms a pair of flaps over the open end of each compartment 72, which function and provide the advantages substantially as described above for the flaps shown in FIGS. 2-4. Alternately, flaps with shapes other than H could be used in sheet 70, such as the designs noted the prior Figures. Furthermore, in the event that there is a gap between the compartments 72 and the inside of compartment 12, it is noted that sheet 70 can act to prevent air and humidity from entering into the gap. This can help reduce air exchange and frost build up on the walls of freezer compartment 12.

As noted above, while the present invention has been disclosed with reference to certain embodiments, numerous modifications, alterations and changes to the described embodiments are possible without departing from the sphere and scope of the present invention. For example, although a sliding door 14 is shown for covering opening 15, a different type of door, or even no door at all, may be required to achieve the advantageous of the invention. Furthermore, the flaps can be formed integrally with a cap arrangement which can be placed over individual or groups of the compartments 72. Alternately, the flaps can be made of a more rigid material and utilize a more traditional mechanical mechanism, such as a hinge. Accordingly, it is intended that the present invention not be limited to the described embodiments, but that it has the full scope defined by the above language and the claims which follow, as well as equivalents thereof.

The invention claimed is:

1. An article retrieving apparatus comprising,
   a housing,
   an article storage area inside the housing for storing a plurality of articles therein;
   an article extracting device having a grasping end for entering the article storage area and retrieving an article therefrom; and
   a plurality of movable barriers positioned near the article storage area, each barrier having a closed position and an open position,
   wherein when a moveable barrier is moved to the closed position, the barrier decreases the potential for air to move into or out of the article storage area, and when a moveable barrier is moved to the open position there is an increased potential for air to move into or out of the article storage area as compared to when the moveable barrier is in the closed position; and
   wherein in order for the article extracting device to retrieve an article, the grasping end of the article extracting device must initiate a direct physical contact with at least one of said plurality of moveable barriers so as to deflect a portion of said at least one barrier toward said article storage area and thereby create an opening through which said grasping end of the article extracting device must pass to retrieve an article.

2. The apparatus of claim 1, wherein said opening is created by the combined movement of a plurality of said at least one moveable barriers to said open position.

3. The apparatus of claim 1, wherein movement of the article extracting device causes at least one of said plurality of moveable barriers to move into the open position.

4. The apparatus of claim 3, wherein said movement of the article extracting device causes a plurality of said moveable barriers to move into the open position.

5. The apparatus of claim 3, wherein the article extracting device has at least one dimension which determines a minimum size of an opening through which the article extracting device could potentially pass through, and wherein movement of the article extracting device into the storage area causes a minimum number of said plurality of moveable barriers to move to their respective open positions, in order to at least allow the article extracting device to enter into the storage area.

6. The apparatus of claim 1, wherein movement of the article extracting device causes at least one of said plurality of moveable barriers to move into the closed position.

7. The apparatus of claim 1, wherein said plurality of moveable barriers are made of a flexible material.

8. The apparatus of claim 7, wherein the plurality of moveable barriers are formed in a single sheet of flexible material.

9. The apparatus of claim 8, wherein the plurality of moveable barriers comprise a plurality of pairs of opposed flaps, with abutting free ends of the opposed flaps being substantially aligned with a center position of an article stored in the article storage compartment positioned thereunder.

10. The apparatus of claims 9, wherein the plurality of flaps of the sheet-like member are uniformly shaped and uniformly distributed in the sheet-like member.

11. The apparatus of claims 9 wherein the plurality of flaps of the sheet-like member are formed integrally with the sheet-like member.

12. The apparatus of claim 9, wherein each flap of said plurality of pairs of opposed flaps has:
- a perimeter edge which forms a hinge that is substantially aligned with a perimeter edge of a given article stored in the article storage compartment positioned thereunder, and
- a free edge of the flap which abuts the free edge of an opposed flap,
- the opposed flap also having a perimeter edge which forms a hinge, which hinge is in general alignment with a second perimeter edge of said given article stored in the article storage compartment positioned thereunder, which second perimeter edge is opposed to the first mentioned perimeter edge.

13. The apparatus of claim 1, wherein said article storage area includes structure for causing the articles stored therein to be stored in a compartmentalized manner.

14. The apparatus of claim 13, wherein said structure comprises a plurality of containers positioned inside the article storage area.

15. The apparatus of claim 13, wherein said structure comprises a plurality of dividers positioned inside the article storage area.

16. The apparatus of claim 14, wherein each of said containers comprises a box.

17. An article retrieving apparatus comprising,
- a housing, an article storage area inside the housing for storing a plurality of articles therein;
- an article extracting device having a grasping end for entering the article storage area and retrieving an article therefrom; and
- a plurality of movable barriers positioned near the article storage area, each barrier having a closed position and an open position,
- wherein when a moveable barrier is moved to the closed position, the moveable barrier decreases the potential for air to move into or out of the article storage area, and when a moveable barrier is moved to the open position there is an increased potential for air to move into or out of the article storage area as compared to when the moveable barrier is in the closed position; and
- wherein in order for the article extracting device to retrieve an article, a portion of the article extracting device near the grasping end of the article extracting device must initiate a direct physical contact with at least one of the plurality of said moveable barriers, so as to push a portion of said at least one barrier so that it is deflected in toward the article storage area and into the open position by the action of said grasping end of the article extracting device passing into the article storage area.

18. The apparatus of claim 17, wherein said movement of the article extracting device causes a plurality of said moveable barriers to move into the open position.

19. The apparatus of claim 17, wherein the article extracting device and an article from the article storage area which is grasped thereto has at least one dimension which determines a minimum size of an opening through which the article extracting device and the article grasped thereto could potentially pass through, and wherein movement of the article extracting device and the article grasped thereto out from the storage area causes a minimum number of said plurality of moveable barriers to move to their respective open positions, in order to at least allow the article extracting device and the article grasped thereto to exit out of the storage area.

20. The apparatus of claim 17, wherein said plurality of moveable barriers are made of a flexible material.

21. The apparatus of claim 20, wherein the plurality of moveable barriers are formed in a single sheet of flexible material.

22. The apparatus of claim 17, wherein said opening is created by the combined movement of a plurality of said moveable barriers to said open position.

23. The apparatus of claim 17, wherein said article storage area includes structure for causing the articles stored therein to be stored in a compartmentalized manner.

24. The apparatus of claim 23, wherein said structure comprises a plurality of containers positioned inside the article storage area.

25. The apparatus of claim 23, wherein said structure comprises a plurality of dividers positioned inside the article storage area.

26. The apparatus of claim 24, wherein each of said containers comprises a box.

27. An article retrieving apparatus comprising,
- a housing,
- an article storage area inside the housing for storing a plurality of articles therein;
- an article extracting device having a grasping end for entering the article storage area and retrieving an article therefrom; and
- a plurality of flexible movable barriers positioned near the article storage area, each barrier being flexible so as to be able to move from a closed position and an open position,
- wherein when a moveable barrier is flexed so as to be moved to the closed position, the barrier decreases the potential for air to move into or out of the article storage area, and when a moveable barrier is flexed so as to be moved to the open position there is an increased potential for air to move into or out of the article storage area as compared to when the moveable barrier is in the closed position; and
- wherein in order for the article extracting device to retrieve an article, the grasping end of the article extracting device passes into the article storage area through an opening which is created when a portion of at least one of said plurality of moveable barriers is deflected in toward the article storage area by a direct physical contact which is initialed by said article extracting device, so as to be moved into the said open position.

28. The apparatus of claim 27, wherein said at least one of said plurality of moveable barriers is deflected so as to be moved into the said open position by direct physical contact between the grasping end of said article extracting device and said at least one flexible moveable barrier.

* * * * *